United States Patent [19]
Ohkubo

[11] 4,443,723
[45] Apr. 17, 1984

[54] VENTILATION DEVICE FOR A ROTATING ELECTRIC MACHINE
[75] Inventor: Sumiharu Ohkubo, Nagasaki, Japan
[73] Assignee: Mitsubishi Denki Kabushiki Kaisha, Tokyo, Japan
[21] Appl. No.: 394,729
[22] Filed: Jul. 2, 1982
[30] Foreign Application Priority Data
Jul. 16, 1981 [JP] Japan .................. 56-111629
[51] Int. Cl.³ ............................ H02K 9/00
[52] U.S. Cl. ........................ 310/53; 310/59; 310/62
[58] Field of Search ............ 310/52, 53, 57, 58, 310/59, 60 R, 61, 62, 63, 64, 65

[56] References Cited
U.S. PATENT DOCUMENTS

| 1,916,339 | 7/1933 | Smith | 310/57 |
| 3,017,526 | 1/1962 | Luenberger | 310/62 |
| 3,075,105 | 1/1963 | Erickson | 310/63 |
| 3,800,173 | 3/1974 | Rosenberry | 310/59 |
| 4,186,317 | 1/1980 | Sisk | 310/62 |

FOREIGN PATENT DOCUMENTS
52-24644 7/1977 Japan ........................ 310/62

Primary Examiner—R. Skudy
Attorney, Agent, or Firm—Oblon, Fisher, Spivak, McClelland & Maier

[57] ABSTRACT

A ventilation device for a rotating electric machine comprises a first side plate having an opening at the center near which a fan is placed, a second side plate placed facing the first side plate and a sucking chamber formed by a shielding plate which covers between both the side plates except for an intake port so as to feed cooling air by the fan from the intake port through the sucking chamber and the opening of the first side plate to the rotating electric machine body, wherein a whirling stream prevention plate for preventing the whirling of air flow in the sucking chamber is placed in the sucking chamber.

3 Claims, 4 Drawing Figures

VENTILATION DEVICE FOR A ROTATING ELECTRIC MACHINE

BACKGROUND OF THE INVENTION

1. Field of the Invention

The present invention relates to a ventilation device for feeding cooling air toward a rotating electric machine body from one or both sides of the rotating electric machine by revolution of a fan to cool the same.

2. Description of the Prior Art

FIGS. 1 and 2 illustrate the conventional device of this kind. In the figures, the reference numeral (1) designates a stator core, (2) designates a rotor core surrounding the stator core, (3) designates a stationary coil at one end of the stator core, (4) designates an end ring at one end of the rotor core, (5) designates a fan, (6) designates a rotary shaft, (7) designates a spider mounted on said shaft and to which the rotor core and fan are mounted, (8) designates a first side plate (referred to as a ventilation guide) which is placed near the fan (5), abuts one side of the stator core, and has an opening at the center, (9) designates a housing and (10) designates a second side plate of the housing placed facing the ventilation guide (8) with a gap in the axial direction. The reference numeral (21) designates an intake port in the housing for cooling air which is formed between the ventilation guide (8) and the second side plate (10), (22) designates a discharge port in the housing and separated from the intake port by the ventilation guide, (11) designates a shielding plate of the housing placed to cover between the ventilation guide (8) and the second side plate (10) except for the intake port, and (20) designates a sucking chamber formed by the ventilation guide (8), the second side plate (10) and the shielding plate (11).

In the conventional rotating electric machine, when the fan (5) and the rotor core (2) are rotated with the rotary shaft (6), cooling air is sucked through the intake port (21) into the sucking chamber (20). One part of the cooling air is passed through the opening of the ventilation guide (8) and the fan (5) to cool the stationary coil (3) and the other part is directed in the axial direction from the spaces of the spider (7) to cool the rotor core (2) and the stator core (1) and is discharged through the discharge port (22) of the frame (9).

In the conventional rotating machine having the structure described above, the cooling air is sucked through the intake port (21) into the sucking chamber (20) as shown by the arrow marks (a), (b) in FIG. 2 and flows while whirling as shown by the arrow marks (c), (d) by centrifugal effect caused by revolution of the fan (5). Near the portion designated by the letter (e), a whirling air stream (d) crosses sucked air stream (b), thus the sucked air stream (b) is deflected in the direction as shown by the broken line. A part of the whirling air stream (d) is also deflected in the direction shown by the arrow mark (f) to be discharged through the intake port (21).

It is necessary that the direction of the cooling air flowing to the blades of the fan (5) and the rotor core is changed by 90° with reference to the sucking direction; however it is extremely difficult to change the direction of flow because of the force of inertia of the whirling streams (c), (d), so that imaginary resistance of air flow increases. It is therefore, observed to be difficult to effectively cool the cores and the coils.

SUMMARY OF THE INVENTION

It is an object of the present invention to overcome the disadvantage of the conventional device and to provide a ventilation device for a rotating electric machine which provides a smooth stream of cooling air and improves cooling effect by means of a simple whirling stream prevention plate.

The foregoing and the other objects of the present invention have been attained by providing a ventilation device for a rotating electric machine housing a first side plate having an opening at the center near which a fan is placed, a second side plate facing the first side plate and a sucking chamber formed by a shielding plate which covers an area between both the side plates except for an intake port so as to feed cooling air by the fan from the intake port through the sucking chamber and the opening of the first side plate to the rotating electric machine body, wherein a whirling air stream prevention plate for preventing the whirling of air flow in the sucking chamber is placed in the sucking chamber.

DETAILED DESCRIPTION OF THE PREFERRED EMBODIMENTS

Figure 1:
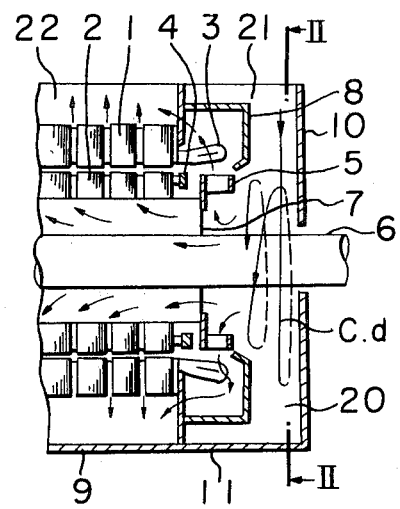
FIG. 1 is a longitudinal cross sectional view of the important part of the conventional rotating electric machine.
Figure 2:
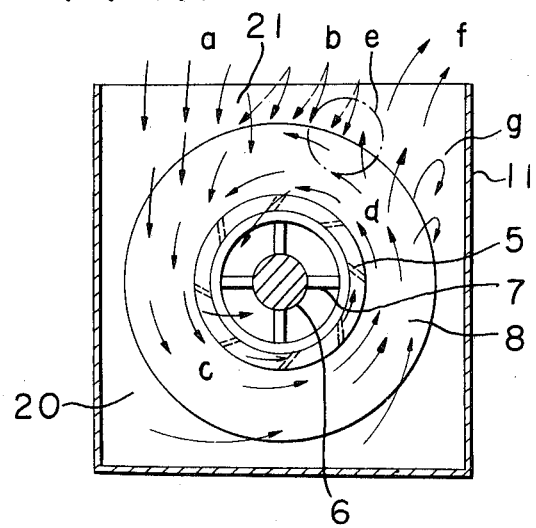
FIG. 2 is a sectional view taken along the line II—II of the FIG. 1.
Figure 3:
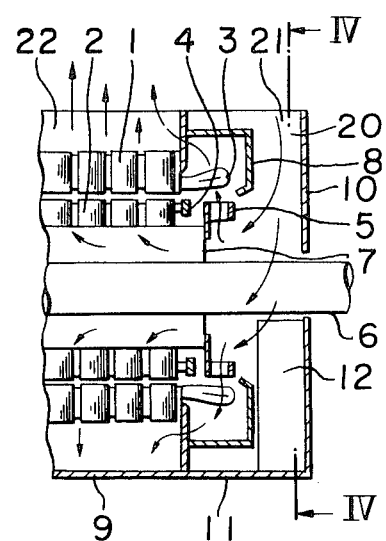
FIG. 3 is a longitudinal sectional view of an embodiment of the rotating electric machine of the present invention.
Figure 4:
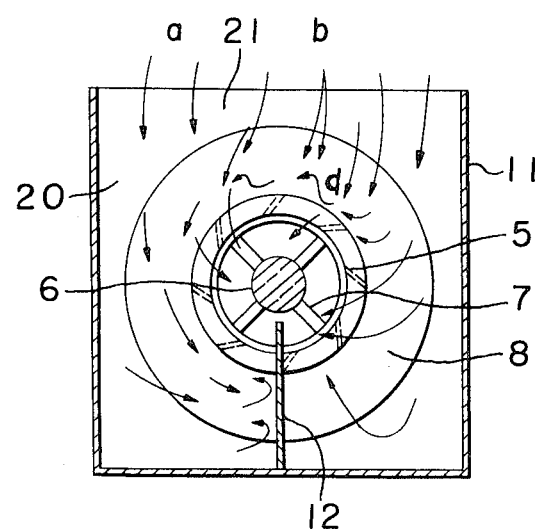
FIG. 4 is a cross sectional view taken along the line IV—IV of the FIG. 3.

An embodiment of the present invention will be described with reference to FIGS. 3 and 4. A whirling stream prevention plate (12) is placed between the side walls of the ventilation guide (8) and the second side plate (10) in the axial direction and the whole area of the cross section of air feeding passage in the position opposite the intake port (21) for cooling air with reference to the rotary shaft (6).

The operation of the ventilation device of the present invention will be described. The same description as with the conventional device can be applied to the function that when the fan (5) and the rotator core (2) are rotated with the rotary shaft (6), the cooling air is sucked through the intake port (21). A force is imparted to the sucked cooling air to cause a whirling stream due to the centrifugal effect of the fan (5). However, occurrence of the whirling stream (coaxially circular stream) is prevented at one point of a circumference because the whirling stream prevention plate (12) is placed in the sucking chamber (20) in the position opposite the intake port (21). The whirling of the cooling air around the entire circumference is, therefore, prevented and only a stream having radial component is locally produced. As a result, even though the sucked air stream (b) crosses the whirling air stream (d), disturbance of the air stream is not substantially caused and discharge of the cooling air from a part of the intake port (21), which has been found in the conventional device, can be prevented. The cooling air sucked for the blades of the fan (5) and the rotor core has low speed of the whirling stream, so that the flowing direction can be easily changed and feeding rate of the cooling air for cooling the rotor core increases whereby cooling effect to the cores and coils increases to keep temperature of the coil low. Thus, the structure of the present invention improves reliability of a rotary electric machine and miniaturizes the same.

In the embodiment described above, the device has an intake port at one end and a discharge port at the central portion of a frame. The device may have the intake port at one end and the discharge port at the other end of the frame. The ventilation device is of an open type device for feeding cooling air to a rotor core and a stator core directly. The same effect can be attained to a totally-enclosed fan cooled type machine for feeding air from the opening of the ventilation guide (8) to the outer side of the frame. An axial flow fan may be used instead of the radial fan.

As described above, in accordance with the present invention, a whirling stream prevention plate is placed in a sucked air passage for cooling air whereby the cooling air is prevented to return to the intake port in the sucking chamber, so that flow rate of the cooling air to the cores and so on increases and cooling effect is improved.

What is claimed as new and desired to be secured by Letters Patent of the United States is:

1. In a rotating electric machine having a housing including a side plate, a stator, and a rotor assembly mounted on a rotor shaft extending through said side plate and into said housing in an axial direction, a ventilation-device comprising:

a ventilation guide adjacent an end of said stator and extending axially to a portion facing said side plate, said facing portion of said ventilation guide being axially spaced from said side plate, said ventilation guide and said side plate defining a suction chamber located axially between said side walls and said ventilation guide;

an intake port in said housing at an axial position corresponding to said ventilation guide and said suction chamber;

a discharge port in said housing at an axial position spaced from said suction chamber by said ventilation guide;

a fan fixed to said rotor assembly and positioned in said ventilation guide; and a single radially extending whirling stream prevention plate positioned in said suction chamber only at a position spaced from said intake port by said rotor shaft, said whirling stream prevention plate axially extending for substantially the entire axial space between said side plate and said ventilation guide, whereby swirling of air in said suction chamber is prevented.

2. The ventilation device of claim 1 wherein said whirling stream prevention plate has at least one side edge attached to an inner wall of said side plate.

3. The ventilation device of claim 1 wherein said intake port extends in said housing for approximately 25% of the circumferential extent of said housing.

* * * * *